(12) United States Patent
Johnson et al.

(10) Patent No.: US 10,021,751 B2
(45) Date of Patent: Jul. 10, 2018

(54) LIGHTING SYSTEM AND METHOD FOR PWM ADJUSTABLE CURRENT CONTROL

(71) Applicant: Black Tank LLC, Haverhill, MA (US)

(72) Inventors: Douglas A. Johnson, Groveland, MA (US); Michael W. Johnson, Amesbury, MA (US)

(73) Assignee: Black Tank LLC, Haverhill, MA (US)

( * ) Notice: Subject to any disclaimer, the term of this patent is extended or adjusted under 35 U.S.C. 154(b) by 0 days.

(21) Appl. No.: 15/381,267

(22) Filed: Dec. 16, 2016

(65) Prior Publication Data

US 2017/0181242 A1    Jun. 22, 2017

Related U.S. Application Data

(60) Provisional application No. 62/267,999, filed on Dec. 16, 2015.

(51) Int. Cl.
| | |
|---|---|
| *H05B 37/02* | (2006.01) |
| *H05B 33/08* | (2006.01) |
| *F21Y 113/13* | (2016.01) |
| *F21Y 115/10* | (2016.01) |
| *F21S 8/04* | (2006.01) |
| *F21V 23/00* | (2015.01) |
| *F21S 8/06* | (2006.01) |
| *F21V 21/30* | (2006.01) |

(52) U.S. Cl.
CPC ..... *H05B 33/0857* (2013.01); *H05B 33/0815* (2013.01); *H05B 33/0845* (2013.01); *F21S 8/04* (2013.01); *F21S 8/043* (2013.01); *F21S 8/066* (2013.01); *F21V 21/30* (2013.01); *F21V 23/005* (2013.01); *F21Y 2113/13* (2016.08); *F21Y 2115/10* (2016.08); *H05B 33/0803* (2013.01)

(58) Field of Classification Search
CPC ............ H05B 33/0815; H05B 33/0845; H05B 33/0854; H05B 33/0869; H05B 33/0872
USPC .................................................. 315/307, 312
See application file for complete search history.

(56) References Cited

U.S. PATENT DOCUMENTS

| | | | |
|---|---|---|---|
| 6,606,332 B1 | 8/2003 | Boscha | |
| 8,541,956 B2 | 9/2013 | Lee et al. | |
| 2002/0145041 A1 | 10/2002 | Muthu et al. | |
| 2005/0156103 A1* | 7/2005 | May ...................... | G01J 3/0254 250/228 |
| 2006/0187081 A1* | 8/2006 | Gloisten .................. | B60Q 3/47 340/4.3 |

(Continued)

FOREIGN PATENT DOCUMENTS

WO    2015004440 A1    1/2015

OTHER PUBLICATIONS

PCT International Search Report and Written Opinion dated Feb. 23, 2017 for PCT/US2016/067095.

*Primary Examiner* — Tung X Le
(74) *Attorney, Agent, or Firm* — Brooks Kushman P.C.

(57) ABSTRACT

A lighting system is provided with a device for emitting light in response to receiving electrical current, a microprocessor and a current source. The microprocessor is programmed to provide a color control signal and an intensity control signal that are independently controllable relative to each other. The current source is adapted to provide the electrical current to the device at an amplitude based on the color control signal and at an on-off timing based on the intensity control signal.

21 Claims, 7 Drawing Sheets

(56) References Cited

U.S. PATENT DOCUMENTS

| | | | |
|---|---|---|---|
| 2009/0302779 A1* | 12/2009 | McKinney | H05B 33/0818 |
| | | | 315/294 |
| 2010/0301777 A1* | 12/2010 | Kraemer | H05B 33/0803 |
| | | | 315/312 |
| 2011/0006707 A1* | 1/2011 | Baaijens | H05B 33/0863 |
| | | | 315/307 |
| 2011/0018465 A1* | 1/2011 | Ashdown | H05B 33/0818 |
| | | | 315/294 |
| 2011/0266974 A1 | 11/2011 | Thornton et al. | |
| 2013/0328946 A1 | 12/2013 | Zenker et al. | |
| 2014/0062297 A1* | 3/2014 | Bora | H05B 33/0863 |
| | | | 315/34 |
| 2014/0300283 A1 | 10/2014 | Lee et al. | |
| 2015/0116379 A1 | 4/2015 | Lim | |
| 2015/0230310 A1* | 8/2015 | Sugaya | G02F 1/133603 |
| | | | 349/69 |
| 2015/0373790 A1* | 12/2015 | Boswinkel | H05B 33/083 |
| | | | 315/186 |
| 2016/0044753 A1 | 2/2016 | Lee | |

* cited by examiner

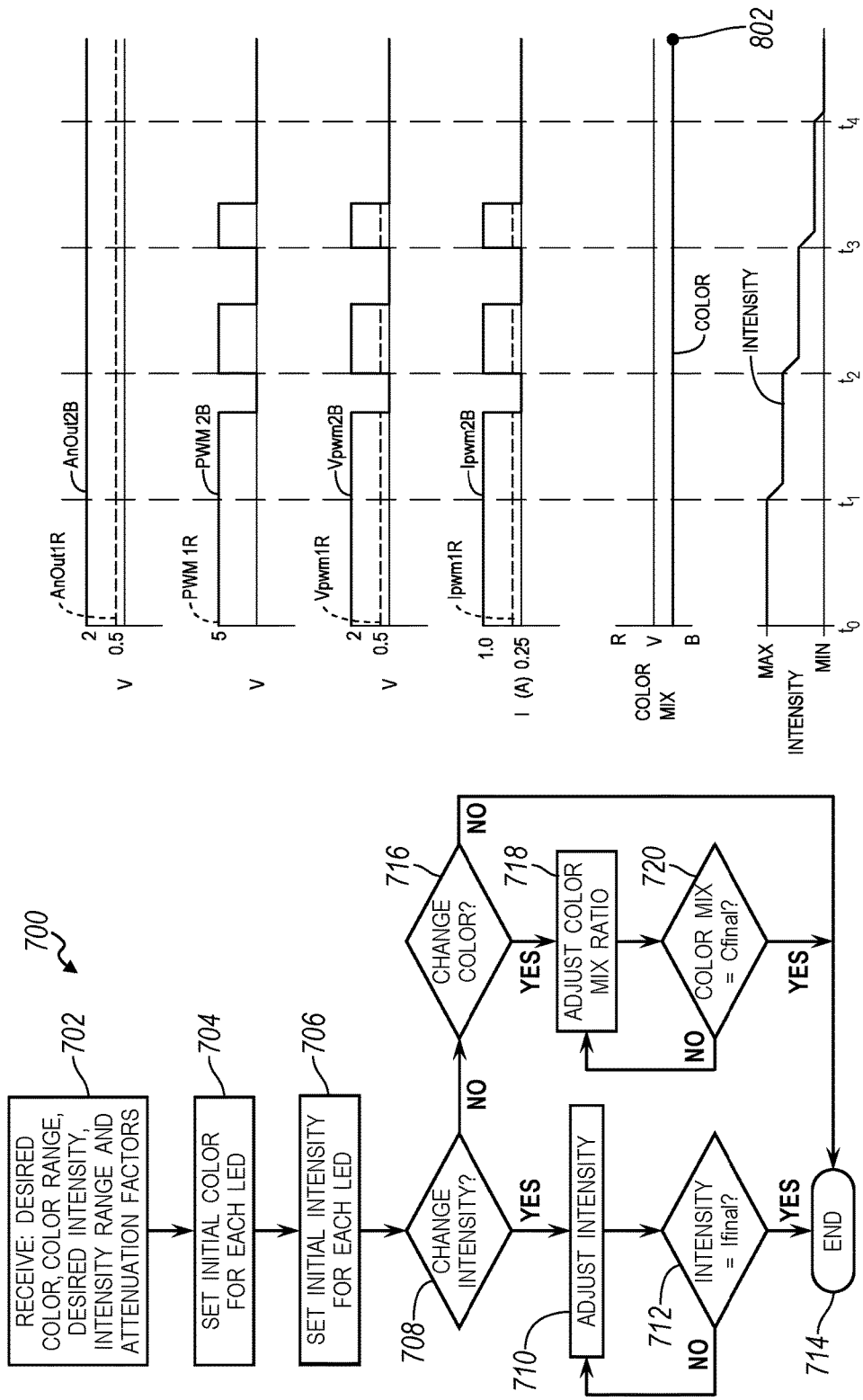

LIGHTING SYSTEM AND METHOD FOR PWM ADJUSTABLE CURRENT CONTROL

CROSS-REFERENCE TO RELATED APPLICATIONS

This application claims the benefit of U.S. provisional application Ser. No. 62/267,999 filed Dec. 16, 2015, the disclosure of which is hereby incorporated in its entirety by reference herein.

TECHNICAL FIELD

One or more embodiments relate to a lighting system and method for controlling the lighting system.

BACKGROUND

Controlling high brightness light emitting diodes (LEDs) with pulse width modulation (PWM) signals is a well-known and a widely implemented method of adjusting LED brightness. The concept of how a PWM signal modulates the LED brightness is straight forward. As the duty cycle of the PWM signal increases, the on-time of the LED increases and as a result more photons, per unit time, are generated. The circuitry involved typically includes a current source that delivers the desired current to the LED. The current source is then turned on and off by the PWM control signal. By doing this, the instantaneous current supplied to the LED remains constant, and it's the "time averaging" of how long the current is present versus how long the current is turned off, that determines the LED brightness.

There are numerous microprocessors available that have PWM control hardware built in, along with serial communication hardware, and a host of other useful peripherals.

SUMMARY

In one embodiment, a lighting system is provided with at least one device for emitting light in response to receiving electrical power and a microprocessor. The microprocessor is programmed to set a value of a current source used to drive the device based on amplitude, and to determine the "on-off" timing of the driven device based on at least one of frequency, resolution, and duty cycle.

In another embodiment, a lighting system is provided with a device for emitting light in response to receiving electrical current, a microprocessor and a current source. The microprocessor is programmed to provide a color control signal and an intensity control signal that are independently controllable relative to each other. The current source is adapted to provide the electrical current to the device at an amplitude based on the color control signal and at an on-off timing based on the intensity control signal.

In yet another embodiment, a lighting system is provided with a first device for emitting first color light in response to receiving first electrical current and a second device for emitting second color light in response to receiving second electrical current. The first color light is different than the second color light. The lighting system is also provided with a microprocessor, a first current source and a second current source. The microprocessor is programmed to receive input indicative of a desired color and a desired intensity, and to determine a color ratio of a first component to a second component to collectively provide the desired color. The first component corresponds to the first color light and the second component corresponds to the second color light. The microprocessor is further programmed to provide: a first color control signal based on the first component of the color ratio, a second color control signal based on the second component of the color ratio, and first and second intensity control signals based on the desired intensity. The first current source is adapted to provide the first electrical current to the first device at an amplitude based on the first color control signal and at a duty cycle based on the first intensity control signal. The second current source is adapted to provide the second electrical current to the second device at an amplitude based on the second color control signal and at a duty cycle based on the second intensity control signal.

In still yet another embodiment, a method is provided for controlling a lighting system. A first device is provided for emitting first color light in response to receiving first electrical current. A second device is provided for emitting second color light in response to receiving second electrical current, wherein the first color light is different than the second color light. Input is received that is indicative of a desired color and a desired intensity. A color ratio of a first component to a second component to collectively provide the desired color, is determined. The first component corresponds to the first color light and the second component corresponds to the second color light. A first color control signal is provided that is based on the first component of the color ratio. A second color control signal is provided that is based on the second component of the color ratio. First and second intensity control signals are provided that are based on the desired intensity. The first electrical current is provided to the first device at an amplitude based on the first color control signal and at a duty cycle based on the first intensity control signal. The second electrical current is provided to the second device at an amplitude based on the second color control signal and at a duty cycle based on the second intensity control signal.

As such, the lighting system and method provides advantages over existing technology by providing pulse-by-pulse independent & simultaneous control of both the on/off timing (PWM timing) of the LED as well as the current of the pulse given to the LED. This control methodology provides maximum flexibility in LED driving, is easily implementable using common low cost components, and makes possible controlling both the on/off control of current & the instantaneous value of the current at high control frequencies and at high control resolutions.

BRIEF DESCRIPTION OF THE DRAWINGS

FIG. 7 is a flow chart illustrating a method for controlling the lighting system of FIG. 2;

FIG. 8 includes graphs of electrical characteristics that are detected at various locations of the lighting system of FIG. 2;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
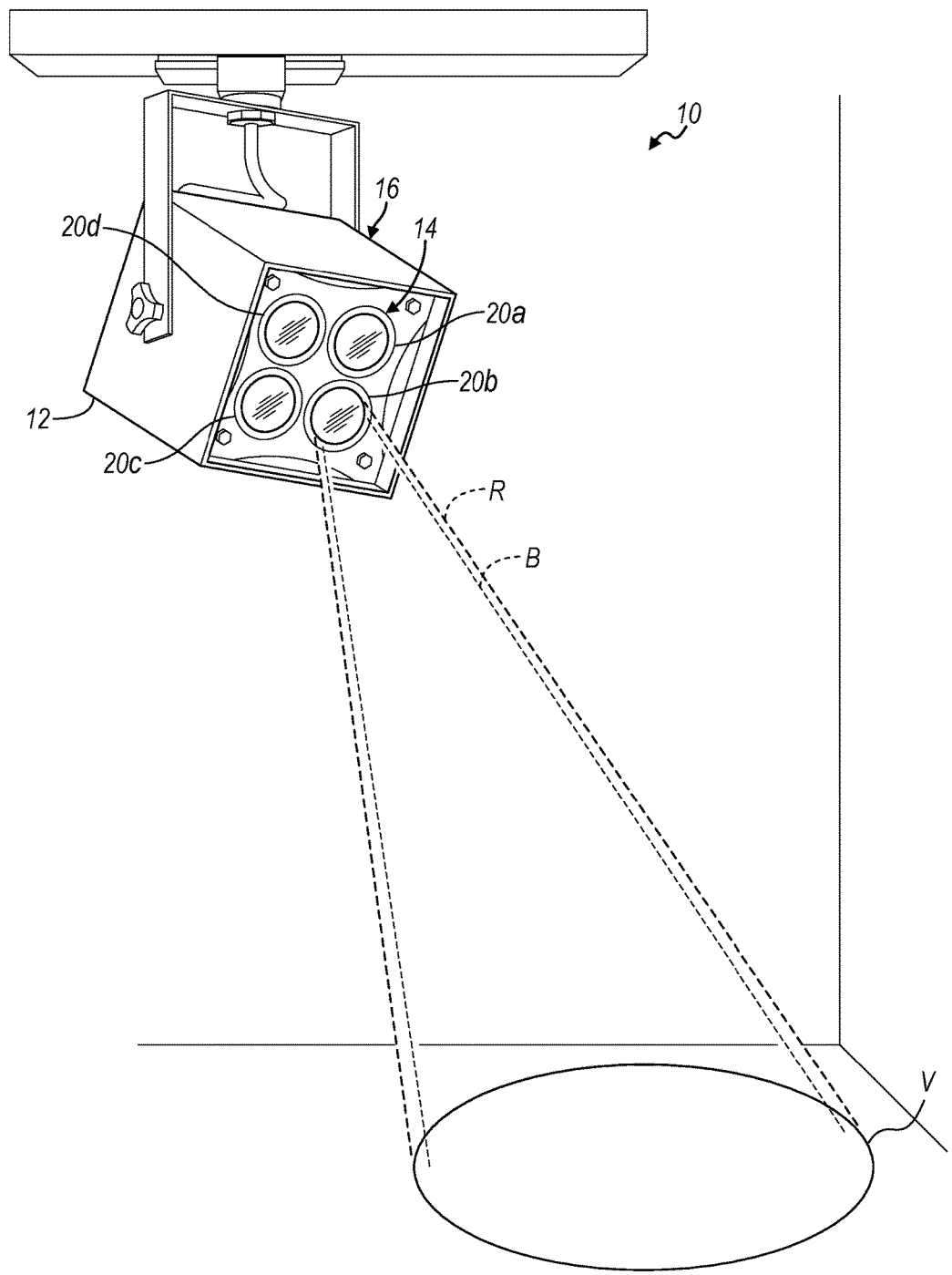
FIG. 1 is a front perspective view of a light fixture having a lighting system according to one or more embodiments.

With reference to FIG. 1, a lighting system is illustrated in accordance with one or more embodiments and referenced by numeral 10. The lighting system 10 is contained within a light fixture 12. The light fixture 12 includes light emitting devices 14 that are supported by a housing 16. The housing 16 is mounted to a support surface, such as a ceiling by a track, according to the illustrated embodiment. The light emitting devices 14 may emit different colors, e.g., blue "B" and red "R", and the lighting system 10 controllably mixes the colors to generate other colors, e.g, violet "V". The lighting system 10 controls the intensity and color-mix of the light emitting devices 14 to maintain a specific color-mix throughout their full intensity ranges.

Figure 2:
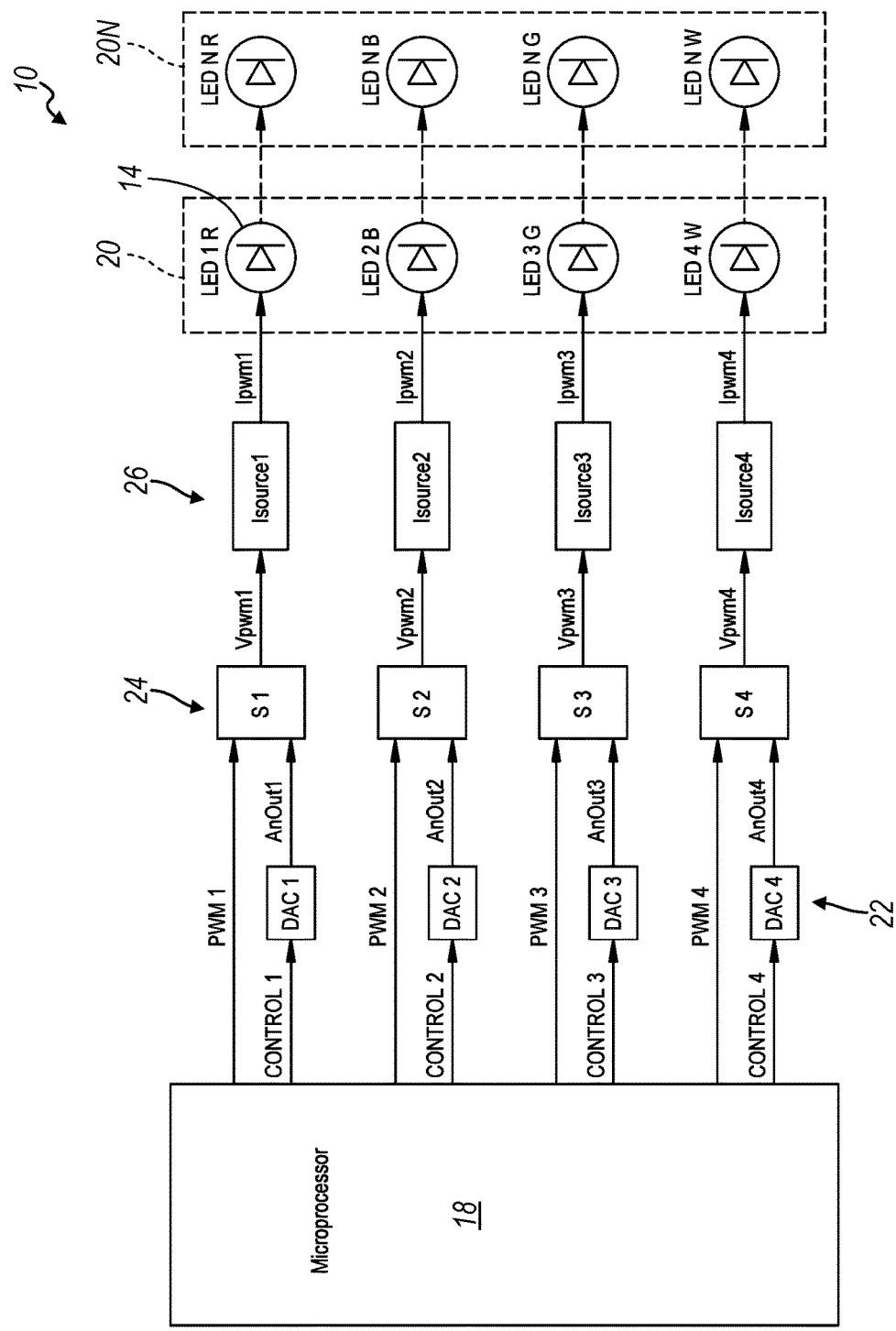
FIG. 2 is a schematic block diagram of the lighting system of FIG. 1.

Referring to FIG. 2, the lighting system 10 includes a microprocessor 18 and a plurality of light emitting devices 14. The light emitting devices 14 are light emitting diodes (LEDs), according to the illustrated embodiment. The microprocessor 18 controls the frequency, period, and duty cycle of the on-off control of the LEDs; it also controls the amplitude of the current being delivered to each LED when the LED is turned "on" by the corresponding PWM signal.

The LEDs 14 are grouped into assemblies of four and mounted to a common printed circuit board (pcb) that is referred to as a "quad chip" 20, according to one embodiment. The light fixture 12 illustrated in FIG. 1 includes four quad chips 20a, 20b, 20c and 20d. Other embodiments of the light fixture 12 include different numbers of quad chips, e.g., one, two or six. This is generally referenced by quad chip 20 and quad chip 20n in FIG. 2. A quad chip 20 may include four LEDs 14 that each emit a different color light, e.g., red, blue, green and white, which is generally depicted by the labels "LED1R," "LED2B," "LED3G" and "LED4W" in FIG. 2. A lighting system 10 having multiple quad chips 20 includes LEDs of like color arranged in series along a string. For example, a red LED 14 (LED1R) of the first quad chip 20 is illustrated in series with a red LED 14 (LEDNR) of quad chip 20n. The lighting system 10 individually controls each string of LEDs 14 to mix the colors for providing different colors. The lighting system 10 also controls the intensity of each string of LEDs 14 for dimming and brightening the intensity of its light. In other embodiments, the quad chip 20 includes LEDS 14 that emit different shades of white (e.g., warm white and cool white) and the lighting system 10 controls the intensity and color temperature of the LEDs 14. In other embodiments, the lighting system 10 includes one or more discrete LEDs (not shown), i.e., LEDs that are not arranged on quad chips.

The lighting system 10 includes hardware and/or firmware for individually controlling the current and duty cycle of the signal provided to each string of LEDs 14. The lighting system 10 includes digital to analog converters (DACs) 22, switches 24 and current sources 26. The DACs 22 generate analog signals of varying amplitude. The microprocessor 18 provides a digital control signal (Control) to each DAC 22 that represents the desired amplitude of an analog signal. And the DAC 22 generates an analog output signal (AnOut) based on Control. The DACs 22 may be implemented using various electronic devices that integrate multiple serially addressable, high resolution digital-to-analog converters in a compact package, such as the quad 10-bit LTC1664 DAC by Linear Technology, the 8-bit TLV5620CD DAC by Texas Instruments and two 8-bit two channel MAX1118 DACs by Maxim Integrated™.

The switches 24 combine digital PWM signals and analog signals. The microprocessor 18 provides a PWM signal (PWM) at a fixed amplitude and variable duty cycle to each switch 24. The switch 24 combines AnOut with PWM to generate a variable voltage PWM signal (Vpwm) having an amplitude based on AnOut and a duty cycle based on PWM. The switches 24 may be implemented using various electronic devices that integrate multiple high speed, low resistance, analog switches in a compact package, such as the single-pole, single-throw 74HC4066 by NXP and two single-pole, single-throw NL7WB66 switches by ON Semiconductor®.

The current sources 26 provide a PWM signal (Ipwm) having a variable current amplitude based on the amplitude of Vpwm and variable duty cycle based on the duty cycle of Vpwm. The current sources 26 may be implemented using various electronic devices or combinations of electronic devices, such as low power, high speed, operational amplifiers (op amps), such as the LMH6642 or LMH6644 op amps by Texas Instruments with high speed, fast charging metal-oxide-semiconductor field-effect transistors (MOSFETs), such as the FQD7N10L and NTD14N03R MOSFETs by ON Semiconductor®.

Figure 3:
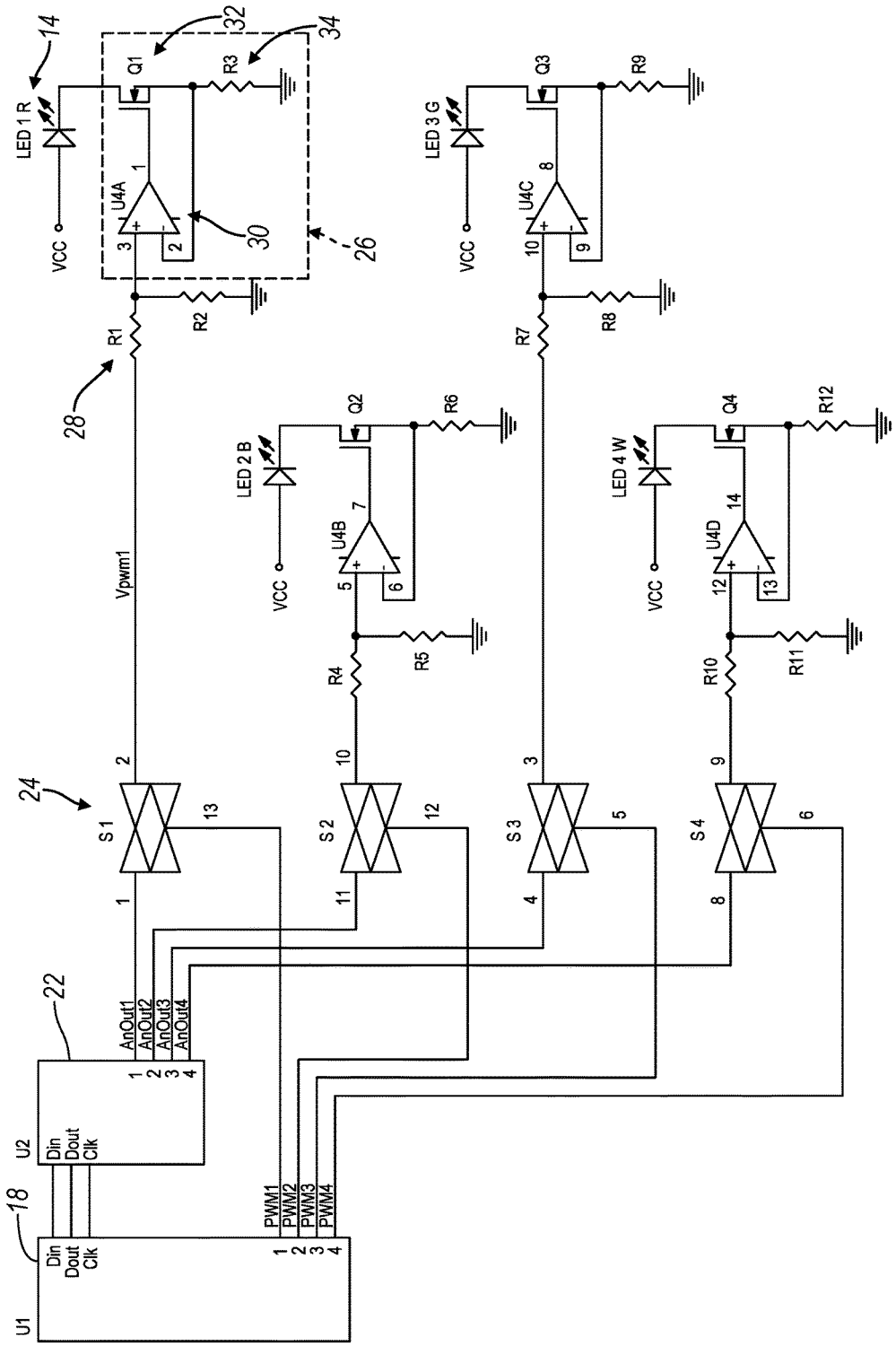
FIG. 3 is a circuit diagram illustrating the lighting system of FIG. 2.

FIG. 3 is a circuit diagram illustrating an implementation of the lighting system 10, according to one embodiment. The microprocessor 18 is a micro-controller with hardware peripherals for controlling four PWM output signals (PWM1-PWM4). The microprocessor 18 also contains peripherals for providing serial data (Din, Dout, Clk) to other integrated circuits. The microprocessor 18 includes firmware that is designed to set-up and control the four PWM peripherals independently from each other, and allow for rapid changes to the signals such that pulse-by-pulse modifications can be made. This firmware is coded using assembly language to make it possible to control the PWM up to a frequency of 16 Khz with 13 bits of resolution. The firmware is further designed to use the serial communication peripheral to set-up and control the DACs 22 such that the four channels can be controlled independently from each other, and in a manner such that high speed modifications can be made "pulse by pulse" or "on-the-fly" (i.e. at the same "real time" update rate as the original PWM duty cycle) to the D/A output voltages.

The DAC 22 is a "Quad" digital to analog converter, according to the illustrated embodiment. The DAC 22 receives serial data from the microprocessor 18 and provides four corresponding analog output voltages (AnOut1-AnOut4).

The switch 24 is a "Quad" analog switch with four independent analog switches (S1-S4) that are each controlled by two control sources, according to the illustrated embodiment. For example, the first analog switch (S1) receives a digital control signal (PWM1) from the microprocessor 18 and an analog control signal (AnOut1) from the DAC 22. S1 provides a variable voltage PWM signal (Vpwm1) to the current source 26 based on these inputs (PWM1 and AnOut1).

The lighting system 10 includes a voltage divider 28 interconnected between each switch 24 and the corresponding current source 26 so that it is in the same relative magnitude as the voltage across the current sense resistor. Each voltage divider 28 includes two resistors R1 and R2 (i.e., a "resistive divider") according to the illustrated embodiment.

Each current source 26 is a constant current circuit including an operational amplifier (Op-Amp) 30 and a metal-oxide-semiconductor field-effect transistor (MOSFET) 32, according to the illustrated embodiment. Each current source 26 provides a PWM signal (Ipwm) having a variable current amplitude and variable duty cycle to its corresponding LED 14. Each current source 26 also includes a current sense resistor 34 that is connected between the negative pin (−) of the Op-Amp 30 and the source of the MOSFET 32 and ground; and uses negative feedback on the Op Amp 30 to make the voltage generated across current sense resistor 34 match the control voltage of Vpwm.

In operation, when the microprocessor 18 controls the first switch S1 to be "on", i.e., by generating a high PWM1 output, the switch 24 connects the DAC 22 to the voltage divider 28. This connection provides Vpwm1 to the first current source 26 and drives LED1 with the current resulting from the desired firmware control of AnOut1. Additionally, when the microprocessor 18 controls S1 to be "off", i.e., by generating a low PWM1 output, S1 disconnects the DAC 22 from the voltage divider 28. This disconnection provides a Vpwm1 of zero volts to the current source 26. And the current source 26 provides a Ipwm1 of zero amps to LED1, which turns LED1 off.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and firmware which co-act with one another to perform any number of the operation(s) as disclosed herein.

Figure 4:
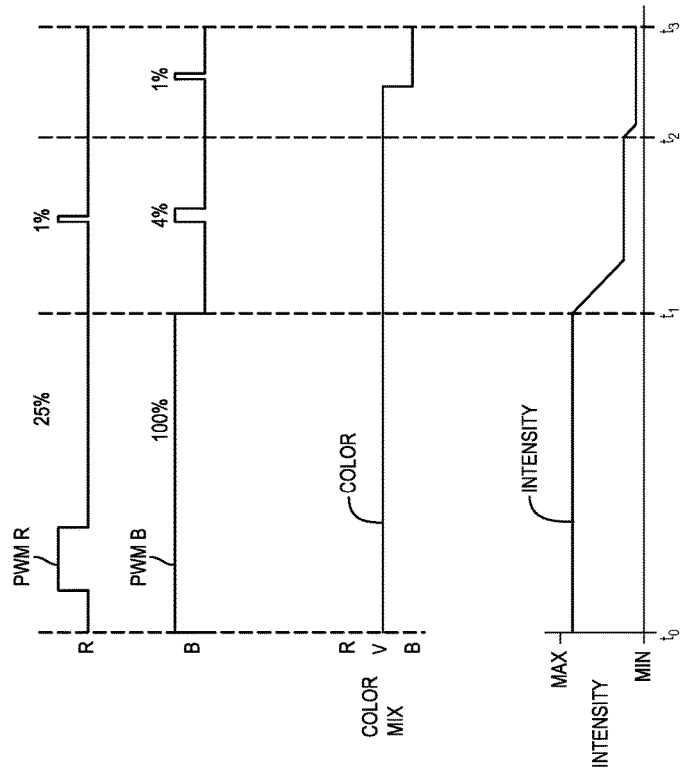
FIG. 4 includes graphs of electrical characteristics that are detected at various locations of a lighting system according to another embodiment.
Figure 5:
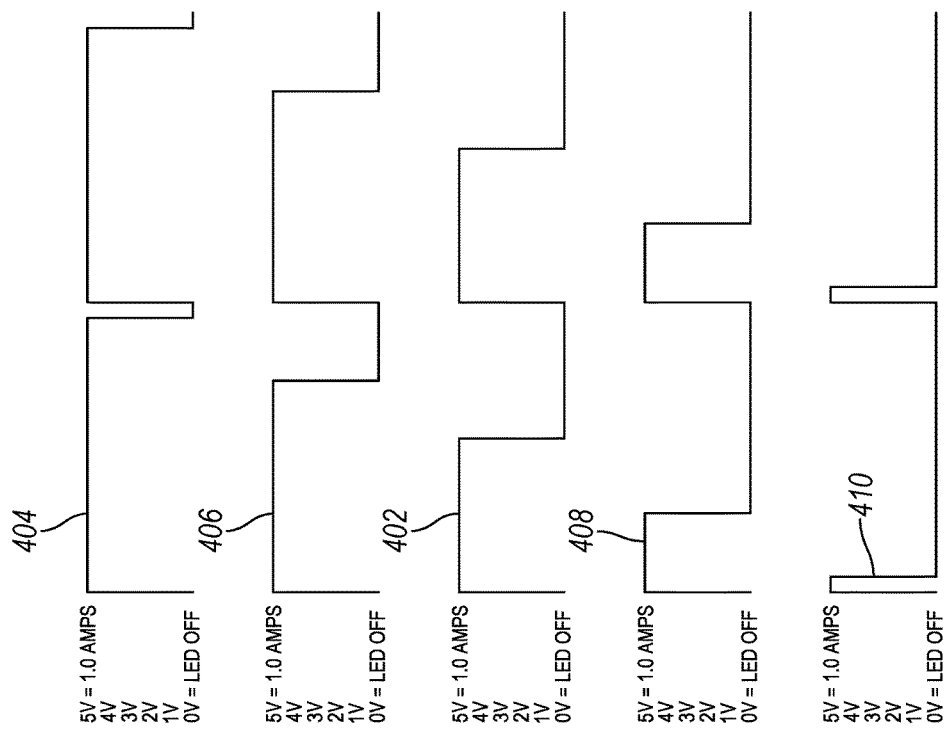
FIG. 5 includes additional graphs of electrical characteristics that are detected at various locations of the lighting system of FIG. 4.

FIGS. 4 and 5 illustrate graphs of electrical characteristics that are detected at various locations of a second lighting system (not shown), in which the intensity and color-mix of the LEDs are controlled according to a second embodiment, using only the frequency, period, and duty cycle of the on-off control of the LEDs. One characteristic of a PWM control signal is frequency, or "period". The frequency is how many times the LED is turned on in one second. The period is the inverse of the frequency, and is the time between successive activations. To keep people from being able to see the on-off "flashing" nature of the PWM control method, the frequency of the PWM signal should be (at least) 200 Hz, which is a period of 5 msec. Faster is typically better, and in high end professional LED equipment the frequency is typically 500 Hz-1000 Hz, or faster.

A second characteristic of the PWM control signal is its resolution. Resolution is a function of the shortest time that the LED can be turned on (or off), and is sometimes expressed as how many of these "shortest times" there are in the PWM period. A common resolution on many microprocessors is 256. With a resolution of 256, the 5 msec of period is divided into 256 parts, and the shortest time the LED can be turned on (or off) is $\frac{1}{256}$ of 5 msec=19.53 μsec. Resolutions of 256 (8 bits), and 1024 (10 bits) are fairly common. Higher resolutions are possible, but become more difficult and costly to implement. These are typically seen in the high end professional LED implementations.

Yet another characteristic of the PWM signal is called "duty cycle" and is normally expressed as a percentage ratio of the "on" time to the "period" (on time/period×100). So for example, a duty cycle of 50% is when the on time and the off time are the same (i.e., on time is half the period), as depicted by curve 402. A duty cycle of 100% is when the LED is on for the complete period (never turns off) (not shown). Also shown in FIG. 4 is a curve 404 depicting a PWM signal with a 95% duty cycle, a curve 406 depicting a PWM signal with a 75% duty cycle, a curve 408 depicting a PWM signal with a 25% duty cycle and a curve 410 depicting a PWM signal with a 5% duty cycle.

In all of the PWM signals illustrated in FIG. 4, the "on" time is always driving the LED to its pre-determined full "on" current, which is 1.0 Amps for the graphs shown in FIG. 4. The PWM signal itself is always presented as a digital signal, either "on" or "off" ("1" or "0"), and "on" always delivers the same current to the LED. Dimming the LED to less than it full brightness can occur because of the time averaging that happens when the LED has "off" time during the period as well.

When multiple channels of different color LEDs are independently driven with multiple PWM signals, color mixing can be achieved. Thus if a Red LED is driven at 100% duty cycle (full on), and a Blue LED is likewise driven at 100%, the result is full intensity Purple. Then, to dim that exact mix of Purple (keep the Purple the same color while reducing its brightness), a lighting system can begin reducing the "duty cycles" of the Red and Blue PWM signals and keep them in the same 1:1 proportion, both set to 50%, or both set to 10%, or both set to 1%. This dimming of the mixed color can continue all the way down to 1 part of resolution of the PWM signal for both LED colors, and the mixed color will remain accurate.

FIG. 5 illustrates graphs of PWM signals for controlling a red LED (R) and a blue LED (B), a curve (Color) representing the resultant color-mix over time and a curve (INTENSITY) representing the intensity of the emitted light. A difficulty with color mixing occurs when the mixed color is not 1:1 between the two (or more) mixed colors. For example, if the Purple is desired to be more of a Violet (deeper blue), at maximum intensity it might have been determined that Red at 25%, combined with Blue at 100% is the desired color (1:4 ratio), as shown between times t0 and t1. When dimming this color, the ratio between the two is kept constant. The problem is illustrated by the realization that once you get to Red at a setting of 1, and Blue at a setting of 4, as shown between times t1 and t2, you can't dim any further and keep the color mix, because you're going to be turning the Red channel completely off, and the result will be Blue, not Violet, as shown by the color mix curve changing to blue (B) after time t2. In practice, the point at which this is reached is a function of the PWM resolution that is being used, but the concept of the problem remains. When using PWM to do LED color mixing, the dimmest accurate color setting is limited by PWM resolution and the color mixing ratios.

Figure 6:
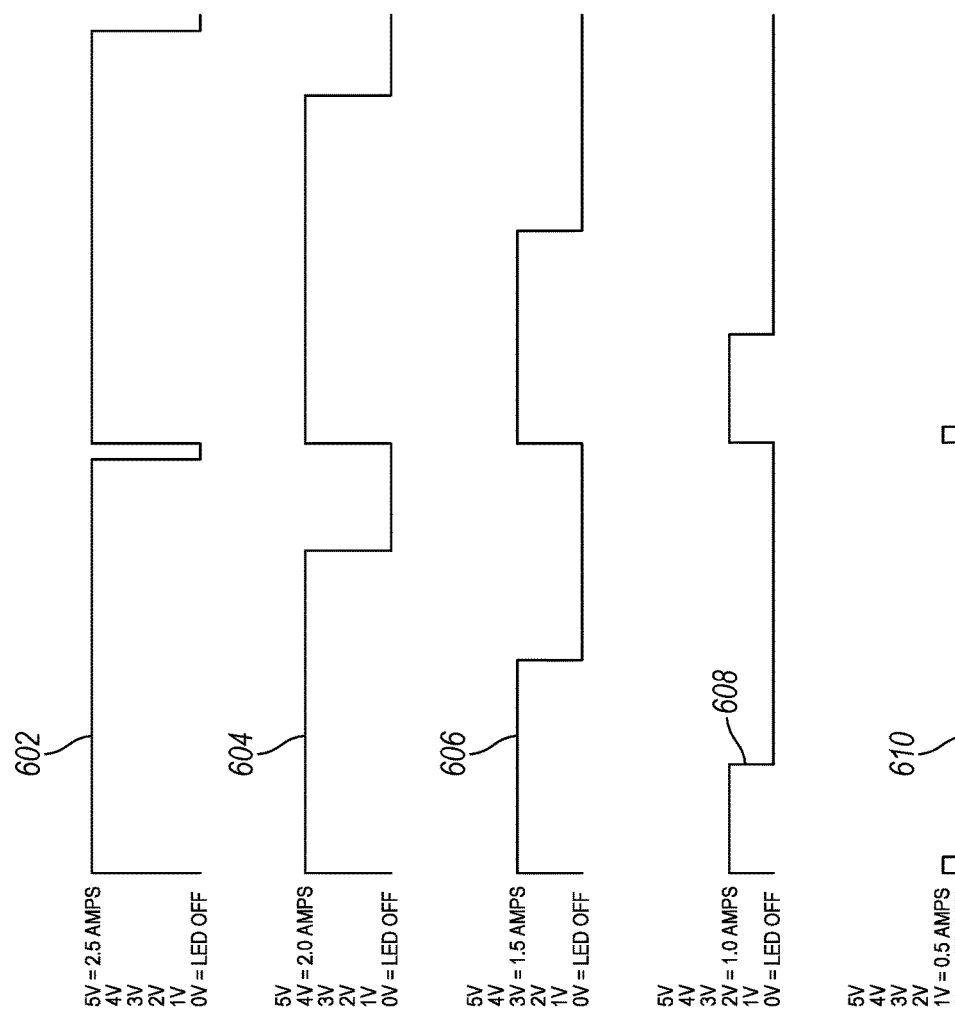
FIG. 6 includes graphs of electrical characteristics that are detected at various locations of the lighting system of FIG. 2.

FIG. 6 illustrates graphs of electrical characteristics that are detected at various locations of the lighting system 10 over time. The lighting system 10 controls the intensity and color-mix of the LEDs using the frequency, period, and duty cycle of the on-off control of the LEDs, along with the instantaneous current provided to LEDs. The lighting system 10 allows the voltage level of the "on" portion of the PWM signal to be a variable voltage (as opposed to being strictly a digital "1" voltage, like 5V for example), and uses it to control the current that's delivered to the LED by the current source. For example, FIG. 6 includes two overlapping curves 602 depicting a 5V PWM signal at 95% duty cycle as generated by the switch 24 and a corresponding 2.5 A PWM signal at 95% duty cycle as generated by the current source 26. FIG. 6 also includes: curves 604 depicting 4V and 2.0 A PWM signals at 75% duty cycle; curves 606 depicting 3V and 1.5 A PWM signals at 50% duty cycle; curves 608 depicting 2V and 1.0 A PWM signals at 25% duty cycle; and curves 610 depicting 1V and 0.5 A PWM signals at 5% duty cycle.

Further, the lighting system 10 may change the voltage of the "on" portion of the PWM signal "on-the-fly", i.e., at the same "real time" update rate as the original PWM duty cycle. Thus not only can the lighting system 10 control the frequency, period, and duty cycle of the on-off control of the LEDs, it can also control the current being delivered to the LED when the LED is turned "on" by the PWM signal.

With reference to FIG. 7, a method for controlling the lighting system 10 is illustrated in accordance with one or more embodiments and represented by numeral 700. The method 700 is implemented using firmware code contained within the microprocessor 18 according to one or more embodiments. While the flowchart is illustrated with a number of sequential steps, one or more steps may be omitted and/or executed in another manner without deviating from the scope and contemplation of the present disclosure. This method solves the problems of the strictly digital PWM control methods, as described above with reference to the lighting system embodiment depicted in FIGS. 4 and 5.

At operation 702, the microprocessor 18 receives lighting settings including a desired color and a desired intensity for the light emitted from the LEDs 14. The desired color may be achieved by mixing multiple LEDs at a color-mix ratio. For example, a desired color of violet may be achieved by mixing blue with red at a ratio of 2:3. The color-mix ratio may be received or determined by the microprocessor. The lighting settings may include a lighting schedule with a color range and intensity range, including initial and final settings and a rate of change of the color/intensity settings. For example, the light schedule may include changing the emitted light from blue to violet and/or dimming the emitted light from full intensity to low intensity over a period of time. In one or more embodiments, the microprocessor 18 also receives an attenuation factor for each LED.

A difficulty with color matching occurs when same color LEDs (e.g., Red LEDs) from two different fixtures emit slightly different shades of Red. This problem can be addressed using attenuation factors to normalize all fixtures to a standard on all the channels. Current manufacturing processes for LEDs result in batches of LEDs having different output (illuminance or shades) capabilities. The LEDs are grouped into different bins based on their predicted illuminance. The attenuation factors are determined by measuring the output of the various channels during manufacturing, and then calculating and recording non-volatile attenuation factors inside the fixture that was measured. These attenuation factors are then used to control the fixture to conform to the "standard" output that is desired.

At operation 704, the microprocessor 18 sets the initial color for each LED. When color mixing multiple color LEDs 14 (e.g., red and blue to get violet), the lighting system 10 sets the ratio of the colors using the control signals (Control) to each DAC 22. The DACs 22 provide analog output signals (AnOut) based on the control signals to the switches 24. If the microprocessor 18 received an attenuation factor (AF) for an LED, then it provides a control signal to the DAC 22 based on the attenuation factor. For example, in one embodiment the microprocessor 18 provides a control signal corresponding to the analog output signal multiplied by the attenuation factor (i.e., AnOutN*AF). Each switch 24 combines AnOut with a PWM signal (PWM) to generate a variable voltage PWM signal (Vpwm), and provides it to the corresponding current source 26. Each current source 26 drives its corresponding LED 14 with a variable current PWM signal (Ipwm) corresponding to the initial color.

At operation 706, the lighting system 10 sets the PWM duty cycle for each LED corresponding to the initial intensity level (Iinitial). The microprocessor 18 provides PWM to each switch 24, which combines it with AnOut as described for operation 704. At operation 708 the microprocessor 18 determines if the lighting settings require a change in intensity, e.g., was a intensity range provided, or just a single intensity value. If the lighting settings included a range, i.e., a change in intensity, the microprocessor proceeds to operation 710.

At operation 710, the lighting system 10 adjusts (e.g., increments) the PWM duty cycle to the second intensity level for each LED. At operation 712, the lighting system 10 evaluates the PWM duty cycle of the current intensity level to determine if it corresponds to the final intensity of the desired range (i.e., does Intensity=Ifinal). If the determination at operation 712 is negative, the lighting system 10 returns to operation 710 and increments the duty cycle again. The lighting system 10 repeats operations 710 and 712 until the current intensity level corresponds to the final intensity level, and after which, the microprocessor 18 proceeds to operation 714 and ends the method. In one embodiment, the lighting system 10 adjusts the duty cycle for all LEDs synchronously, e.g., the duty cycle of the signals to each LED change from 100% to 95% at the same time.

If the microprocessor 18 determines that a change in intensity is not required at operation 708, then the microprocessor 18 proceeds to operation 716. At operation 716, the microprocessor 18 determines if the lighting settings require a change in color, e.g., was a color range provided, or just a single color or color-mix value. If the lighting settings included a range, the microprocessor proceeds to operation 718. If no color change is required, the microprocessor 18 proceeds to operation 714 and ends the method.

At operation 718, the lighting system 10 adjusts the color-mix ratio, e.g., by increasing/decreasing the AnOut of at least one color in the mix. At operation 720, the lighting system 10 evaluates the color-mix of the current color-mix ratio to determine if it corresponds to the final color-mix ratio (Cfinal). If the determination at operation 720 is negative, the lighting system 10 returns to operation 718 and adjusts the color-mix ratio. The lighting system 10 repeats operations 718 and 720 until the current color-mix ratio corresponds to the final color-mix ratio, and after which, the microprocessor 18 proceeds to operation 714 and ends the method.

The method for controlling the lighting system 10 as described with reference to FIG. 7 provides pulse-by-pulse independent & simultaneous control of both the on/off timing (PWM timing) of the LED as well as the current of the pulse provided to the LED. This control methodology provides maximum flexibility in LED driving, is easily implementable using common low cost components, and makes possible controlling both the on/off control of current & the instantaneous value of the current at high control frequencies and at high control resolutions.

The method for controlling the lighting system 10 as described with reference to FIG. 7 provides advantages over other strategies as illustrated by the following examples. These examples include three applications that present considerable difficulties to LED fixture designers when using existing technology:

A. Maintaining a color-mix as the intensity is dimmed all the way to zero;

B. Maintaining a constant total power output while mixing color temperature; and C. Color matching between LEDs with different predicted illuminance or "shades."

FIG. 8 illustrates graphs of electrical characteristics and emitted light over time at various locations of the lighting system 10 illustrated in FIG. 2 under the first application (A), i.e. maintaining a color-mix of different colored LEDs as the intensity is dimmed all the way to zero. FIG. 8 includes six graphs, including a first graph with curves (AnOut1R, AnOut 2B) that represent the analog output signals that are provided by the DAC 22 to the switches 24. The second graph includes curves (PWM1R, PWM2B) that represent the PWM signals that are provided by the microprocessor 18 to the switches 24. The third graph includes curves (Vpwm1R, Vpwm2B) that represent the variable voltage PWM signals that are provided by the switches 22 to the current sources 26. The fourth graph includes curves (Ipwm1R, Ipwm2B) that represent the variable current PWM signals that are provided by the current sources 26 to the LEDs 14. The fifth graph includes a curve (Color) that represents the color of the light that is collectively emitted by the LEDs. The sixth graph includes a curve (INTENSITY) that represents the intensity of the light that is collectively emitted by the LEDs.

When color mixing multiple color LED channels, the lighting system 10 sets the ratio of the colors using the current control portion (the analog "on" voltage) of the PWM signal, leaving the full resolution of the duty cycle portion of the PWM signal to do the dimming, in one or more embodiments. In this way, the dimming can be done from 100% all the way down to zero, regardless of the ratios of the mixed color. In other words, when the mixed color is at maximum brightness, all the PWM channels are at 100% duty cycle and the variable "on" voltage is used to set the various LED intensities to obtain the desired color mix. Then when dimming, the lighting system keeps all of the duty cycles of the various channels in a 1:1 ratio, all the way down to zero, and the color will remain correctly mixed.

Referring to FIGS. 7 and 8, the graphs in FIG. 8 illustrate an example in which the lighting system 10 includes different colored LEDs 14, and receives lighting settings that include: a purple color at a ratio of red to blue of 1:4, no color range (i.e., no change in color) and an intensity range that starts at maximum intensity and dims to zero intensity. At operations 704 and 706 the microprocessor 18 sets the initial color and intensity of each LED 22, which is illustrated at time t0 on the graphs. The microprocessor 18 provides control signals (not shown) that correspond to the red:blue color-mix ratio of 1:4, at t0; and the DAC 22 generates corresponding analog output signals (AnOut1R=0.5V, AnOut2B=2V). The microprocessor 18 also provides control signals (PWM1R, PWM2B) that correspond to the initial intensity of the red and blue LEDs 14, i.e., both are at 100% duty cycle, maximum intensity. The switches 24 combine these signals and provide variable voltage PWM signals (i.e., Vpwm1R at 0.5V and 100% duty cycle, and Vpwm2B at 2V and 100% duty cycle) to the current sources 26. And the current sources 26 provide corresponding variable current PWM signals (i.e., Ipwm1R at 0.25 A and 100% duty cycle, and Ipwm2B at 1.0 A and 100% duty cycle) to the LEDs 14, which results in violet light that is more blue than red.

At operation 708 the microprocessor 18 determines that the lighting settings include a change in intensity, i.e., from maximum intensity to zero intensity (off). Then at operations 710 and 712 the microprocessor 18 reduces the intensity of both the red and blue LEDs 14 gradually from maximum intensity (100% duty cycle) at time t0 to zero intensity (0% duty cycle) at time t4, as shown in FIG. 8. As illustrated by the sixth graph in FIG. 8, the lighting system 10 controls the light emitted by the red and blue LEDs 14 to maintain a constant color throughout the intensity range, until the LEDs are off at point 802. Whereas other lighting systems that control both intensity and color-mix using PWM duty cycle may change color at low intensity when one LED turns off before the other, as illustrated by the COLOR curve in FIG. 5 between time t2 and t3.

Figure 9:
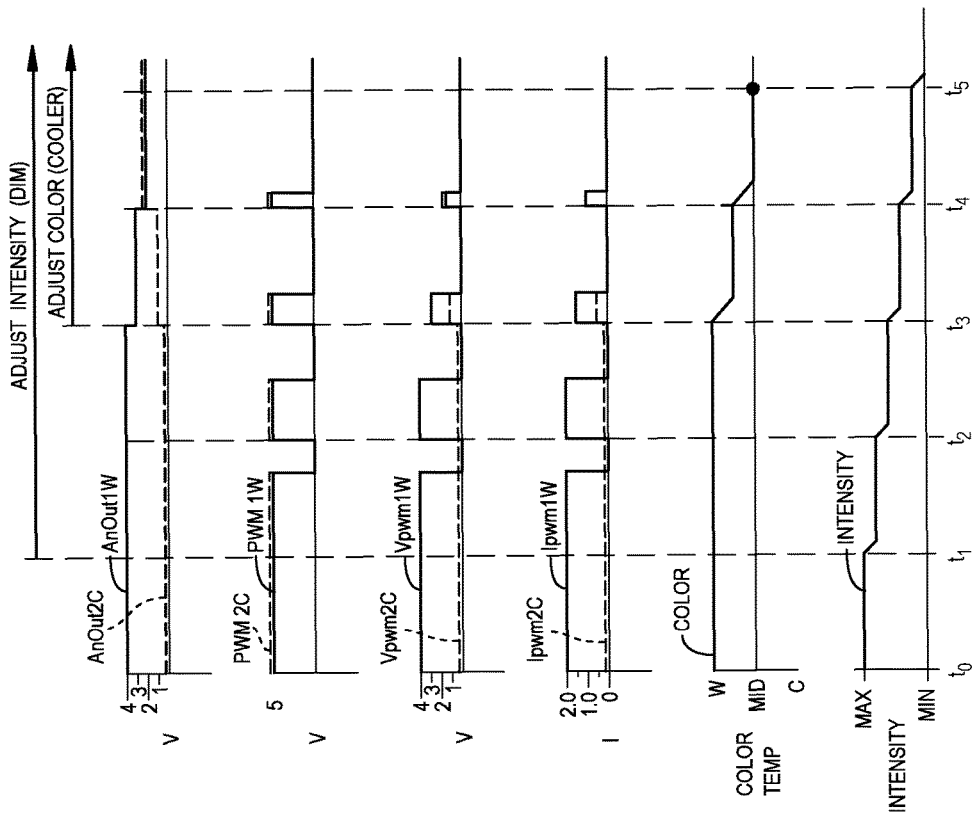
FIG. 9 includes graphs of electrical characteristics that are detected at various locations of the lighting system of FIG. 2.

FIG. 9 illustrates graphs of electrical characteristics and emitted light over time at various locations of the lighting system 10 illustrated in FIG. 2 under the second application (B), i.e., maintaining a constant total power output while mixing color temperature of different correlated color temperature (CCT) colors of white LEDs. Like FIG. 8, FIG. 9 includes six graphs with curves representing: analog output signals (AnOut1W, AnOut2C), PWM control signals (PWM1W, PWM2C), variable voltage PWM signals (Vpwm1W, Vpwm2C), variable current PWM signals (Ipwm1W, Ipwm2C), the color (COLOR) of light collectively emitted by the LEDs, and the intensity (INTENSITY) of light collectively emitted by the LEDs.

When using three color channels of different CCT colors of White LEDs (warm, neutral and cool color temperatures for example), when all three channels are set to 100% power with a traditional PWM scheme, the fixture will be drawing its maximum power, say for example 100 W total (33 W per channel). There are times when it would be desirable to use only the warm white LEDs, but doing this will only provide the lumens of a 33 W fixture (only 1 channel would be on). Each channel could be designed to be able to deliver 100 W of lighting power so that when only one channel of light is used, the fixture can still deliver its rated 100 W of light. Then when all three channels need to be used again, the lighting system 10 controls the adjustable current portion of the PWM signal to set the channels back to 33 W each so that the fixture remains compliant to its 100 W rated capability. In each case, the full range of dimming resolution (the duty cycle portion of the PWM signal) is available to provide the smoothest possible dimming capability.

Referring to FIGS. 7 and 9, the graphs in FIG. 9 illustrate an example in which the lighting system 10 is provided in a two channel all white LED fixture with "warm" LEDs on channel1 (1W) and "cool" LEDs on channel 2 (2C). The fixture is designed to support a total of 100 W LED output power and each channel is able to provide 100 W of power. The lighting system 10 receives lighting settings at operation 702 that include: an initial warm color at a warm to cool color temperature ratio of 1:0, a color temperature range that changes from warm (1:0) to medium (1:1), and an intensity range that starts at maximum intensity and dims to zero intensity.

At operations 704 and 706 the microprocessor 18 sets the initial color and intensity of each LED 14, which is illustrated at time t0 on the graphs. The microprocessor 18 provides control signals (not shown) that correspond to the warm:cool color temperature ratio of 1:0 at t0; and the DAC 22 generates corresponding analog output signals (AnOut1W=4.0V, AnOut2C=0V). The microprocessor 18 also provides control signals (PWM1W, PWM2C) that correspond to the initial intensity of the warm and cool LEDs 14, i.e., both are at 100% duty cycle, maximum intensity. The switches 24 combine these signals and provide variable voltage PWM signals (i.e., Vpwm1W at 4V and 100% duty cycle, and Vpwm2C at 0V and 100% duty cycle) to the current sources 26. The current sources 26 provide corresponding variable current PWM signals (i.e., Ipwm1W at 2.0 A and 100% duty cycle and Ipwm2C at 0.0 A and 100% duty cycle) to the LEDs 14, which results in warm color temperature light at maximum intensity.

At operation 708 the microprocessor 18 determines that the lighting settings also include a change in intensity, i.e., from maximum intensity to zero intensity (off). Then at operations 710 and 712 the microprocessor 18 reduces the intensity of both the warm and cool LEDs 14 gradually from maximum intensity (100% duty cycle) at time t0 to zero intensity (0% duty cycle) at time t5, as shown by the INTENSITY curve in FIG. 9.

At operation 716 the microprocessor 18 determines that the lighting settings include a change in color temperature, i.e., from warm color temperature to medium color temperature. Then at operations 718 and 720 the microprocessor 18 adjusts the color temperature (warm:cool ratio) of both the warm and cool LEDs 14 gradually from warm color temperature (1:0 ratio) at time t3 to medium color temperature (1:1 ratio) at time t4, as shown by the COLOR curve in FIG. 9.

The amount of current provided to the LEDs generally corresponds to the power rating of the lighting fixture, assuming constant voltage conditions. As illustrated by the fourth graph in FIG. 9, the lighting system 10 optimizes the distribution of power throughout the fixture by controlling the LEDs to collectively provide the maximum power output. Between time t0 and t3, the lighting system 10 is only providing power to the warm LEDs, so Ipwm1W is set to its maximum current of 2.0 A. Then once the lighting system 10 starts mixing the warm and cool LEDs at time t3, it decreases the warm LEDs by 0.5 A, from 2.0 A to 1.5 A, and increases the current provided to the cool LEDs from by 0.5 A, from 0.0 A to 0.5 A. Thus at all times the lighting system 10 collectively provides the maximum current (2.0 A) and maximum power 100 W to the LEDs 14.

Figure 10:
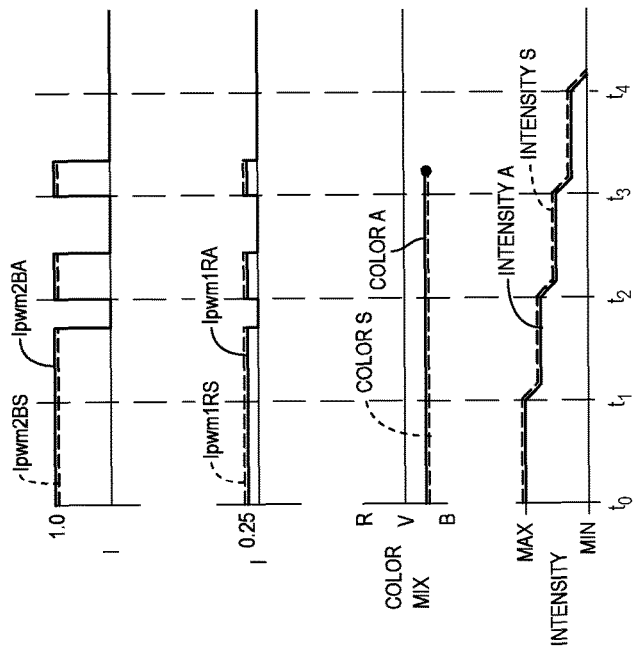
FIG. 10 includes graphs of electrical characteristics that are detected at various locations of the lighting system of FIG. 2.

FIG. 10 illustrates graphs of electrical characteristics and emitted light over time at various locations of the lighting system 10 illustrated in FIG. 2, under the third application (C), i.e., color matching between LEDs with different predicted illuminance, or "shades." FIG. 10 includes four graphs illustrating variable current PWM signals provided to blue (B) LEDs, variable current PWM signals provided to red (R) LEDs and curves representing the resultant color and intensity of light emitted by the LEDs. The variable current PWM signals include standard signals provided to a standard LED (e.g., Ipwm2Bs, Ipwm1Rs), and variable current PWM signals that are based on attenuation factors (Ipwm2Ba, Ipwm2Ra) to adjust the predicted illuminance of the LEDs toward the illuminance of the standard LEDs. In one or more embodiments, the standard signals are set to 80-85% of full amplitude to allow for tolerance on either side.

Referring to FIGS. 7 and 10, the graphs in FIG. 10 illustrate an example in which the lighting system 10 includes a blue LED (Ba) and a red LED (Ra) and receives lighting settings that include: a purple color at a ratio of red to blue of 1:4, no color range (i.e., no change in color), an intensity range that starts at maximum intensity and dims to zero intensity, a red attenuation factor of 1.1 and a blue attenuation factor of 0.9.

At operations 704 and 706 the microprocessor 18 sets the initial color and intensity of each LED 14. The microprocessor 18 provides control signals (not shown) that correspond to the red:blue color-mix ratio of 1:4, and their respective attenuation factors (1.1, 0.9). In this embodiment, the attenuation factors are designed to be multiplied by the variable current PWM signals. And the DAC 22 generates corresponding analog output signals (not shown). The microprocessor 18 also provides control signals (not shown) that correspond to the initial intensity of the red and blue LEDs 14, i.e., both are at 100% duty cycle, maximum intensity. The switches 24 combine these signals and provide variable voltage PWM signals (not shown) to the current sources 26. And the current sources 26 provide corresponding variable current PWM signals (i.e., Ipwm1R at 1.1 A (i.e., 1.0 A*1.1 AF) and 100% duty cycle, and Ipwm2B at 0.23 A (i.e., 0.25 A*0.9 AF) and 100% duty cycle) to the LEDs 14, which results in violet light, that is more blue than red. At operation 708 the microprocessor 18 determines that the lighting settings include a change in intensity, i.e., from maximum intensity to zero intensity (off). Then at operations 710 and 712 the microprocessor 18 reduces the intensity of both the red and blue LEDs 14 gradually from maximum intensity (100% duty cycle) at time t0 to zero intensity (0% duty cycle) at time t4, as shown by the INTENSITYA curve in FIG. 10.

As illustrated in FIG. 10, by modifying the control signal to account for the attenuation factor, the amplitude of the variable current PWM signal varies relative to the standard signals, but the resultant emitted color and intensity are the same, as illustrated by the overlap of the ColorS and ColorA curves. This approach allows for seamless color matching between multiple fixtures, e.g., for applications using multiple fixtures and when replacing a fixture.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lighting system comprising:
   a plurality of devices for emitting light in response to receiving electrical current;
   a microprocessor programmed to:

receive input indicative of a desired color and a desired intensity,
determine a color ratio between at least two components to collectively provide the desired color, wherein each component corresponds to a different color light,
provide a color control signal based on one component of the color ratio for each device of the plurality of devices, and
provide an intensity control signal-based on the desired intensity for each device of the plurality of devices, wherein the color control signal and the intensity control signal are independently controllable relative to each other; and
a plurality of current sources, each current source adapted to provide electrical current to one of the plurality of devices at an amplitude based on one of the color control signal and the intensity control signal, and at an on-off timing based on the other of the color control signal and intensity control signal.

2. The lighting system of claim 1 further comprising a converter connected to the microprocessor and adapted to provide an analog signal based on the color control signal.

3. The lighting system of claim 2 further comprising a switch connected to the microprocessor and to the converter and wherein the switch is adapted to provide a voltage signal to the current source at an amplitude based on the analog signal and at an on-off timing based on the intensity control signal.

4. The lighting system of claim 1 wherein the on-off timing further comprises a duty cycle.

5. The lighting system of claim 1 wherein the current source further comprises an operational amplifier and a transistor.

6. The lighting system of claim 1 wherein the plurality of devices further comprises:
a first device for emitting first color light in response to receiving first electrical current;
a second device for emitting second color light in response to receiving second electrical current;
wherein
the color ratio comprises a ratio of a first component to a second component to collectively provide the desired color, wherein the first component corresponds to the first color light and the second component corresponds to the second color light, and wherein the microprocessor is further programmed to:
provide a first color control signal based on the first component of the color ratio,
provide a second color control signal based on the second component of the color ratio, and
provide a first intensity control signal and a second intensity control signal based on the desired intensity; and
a first current source adapted to provide first electrical current to the first device at an amplitude based on the first color control signal and at an on-off timing based on the first intensity control signal; and
a second current source adapted to provide second electrical current to the second device at an amplitude based on the second color control signal and at an on-off timing based on the second intensity control signal.

7. A light fixture comprising:
a lighting system according to claim 1; and
a housing for supporting the lighting system.

8. A lighting system comprising:
a first device for emitting first color light in response to receiving first electrical current;
a second device for emitting second color light in response to receiving second electrical current, wherein the first color light is different than the second color light;
a microprocessor programmed to:
receive input indicative of a desired color and a desired intensity,
determine a color ratio of a first component to a second component to collectively provide the desired color, wherein the first component corresponds to the first color light and the second component corresponds to the second color light,
provide a first color control signal based on the first component of the color ratio,
provide a second color control signal based on the second component of the color ratio, and
provide first and second intensity control signals based on the desired intensity;
a first current source adapted to provide the first electrical current to the first device at an amplitude based on the first color control signal and at a duty cycle based on the first intensity control signal; and
a second current source adapted to provide the second electrical current to the second device at an amplitude based on the second color control signal and at a duty cycle based on the second intensity control signal.

9. The lighting system of claim 8 wherein the microprocessor is further programmed to:
receive input indicative of a desired initial color and a desired final color; and
adjust at least one of the first color control signal and the second color control signal in response to a current color collectively emitted by the first device and the second device not being equal to the desired final color.

10. The lighting system of claim 8 wherein the microprocessor is further programmed to:
receive input indicative of a desired initial intensity and a desired final intensity; and
adjust both of the first and second intensity control signals in response to a current intensity not being equal to the desired final intensity.

11. The lighting system of claim 8 wherein the microprocessor is further programmed to control the first color control signal and the second color control signal such that a sum of the first electrical current and the second electrical current is equal to a maximum electrical current of the lighting system.

12. The lighting system of claim 8 wherein the microprocessor is further programmed to:
receive input indicative of a first attenuation factor indicative of a predicted illuminance of the first device and a second attenuation factor indicative of a predicted illuminance of the second device;
provide the first color control signal based on a product of the first component of the color ratio and the first attenuation factor; and
provide the second color control signal based on a product of the second component of the color ratio and the second attenuation factor.

13. The lighting system of claim 8 further comprising a first converter connected to the microprocessor and adapted to provide a first analog signal based on the first color control signal.

14. The lighting system of claim 13 further comprising a first switch connected to the microprocessor and to the first converter and wherein the first switch is adapted to provide a first voltage signal to the first current source at an amplitude based on the first analog signal and at duty cycle based on the first intensity control signal.

15. The lighting system of claim 8 wherein the microprocessor is further programmed to control the color control signals independent of the intensity control signals.

16. The lighting system of claim 8, further comprising:
a third device for emitting third color light in response to receiving third electrical current;
wherein the color ratio comprises a ratio of the first component to the second component to a third component to collectively provide the desired color, wherein the first component corresponds to the first color light, the second component corresponds to the second color light, and the third component corresponds to the third color light, and wherein the microprocessor is further programmed to:
provide a third color control signal based on the third component of the color ratio, and
provide first, second and third intensity control signals based on the desired intensity; and
a third current source adapted to provide third electrical current to the third device at an amplitude based on the third color control signal and at a duty cycle based on the third intensity control signal.

17. A method for controlling a lighting system comprising:
providing a first device for emitting first color light in response to receiving first electrical current;
providing a second device for emitting second color light in response to receiving second electrical current, wherein first color light is different than second color light;
receiving input indicative of a desired color and a desired intensity;
determining a color ratio of a first component to a second component to collectively provide the desired color, wherein the first component corresponds to the first color light and the second component corresponds to the second color light;
providing a first color control signal based on the first component of the color ratio;
providing a second color control signal based on the second component of the color ratio;
providing first and second intensity control signals based on the desired intensity;
providing the first electrical current to the first device at an amplitude based on the first color control signal and at a duty cycle based on the first intensity control signal; and
providing the second electrical current to the second device at an amplitude based on the second color control signal and at a duty cycle based on the second intensity control signal.

18. The method of claim 17 further comprising:
receiving input indicative of a desired color range including an initial color, an intermediate color and a final color; and
adjusting at least one of the first color control signal and the second color control signal in response to a current color collectively emitted by the first device and the second device not being equal to the final color.

19. The method of claim 17 further comprising:
receiving input indicative of a desired intensity range including an initial intensity, an intermediate intensity and a final intensity; and
adjusting both of the first and second intensity control signals in response to a current intensity not being equal to the final intensity.

20. The method of claim 17 further comprising controlling the first color control signal and the second color control signal such that a sum of the first electrical current and the second electrical current is equal to a maximum electrical current of the lighting system.

21. The method of claim 17 further comprising:
receiving input indicative of a first attenuation factor indicative of a predicted illuminance of the first device and a second attenuation factor indicative of a predicted illuminance of the second device;
providing the first color control signal based on the first component of the color ratio and the first attenuation factor; and
providing the second color control signal based on the second component of the color ratio and the second attenuation factor.

* * * * *